Patented Sept. 19, 1944

2,358,475

UNITED STATES PATENT OFFICE 2,358,475

MODIFIED DRYING OIL

Burt Carlton Pratt and Henry Shirley Rothrock, Wilmington, Del., assignors to E. I. du Pont de Nemours & Company, Wilmington, Del., a corporation of Delaware No Drawing. Application November 8, 1940, Serial No. 364,946

23 Claims. (Cl. 106—252)

This invention relates to improved plasticizers and coating compositions and especially to improved drying oil compositions.

Certain drying oils such as wood oil and perilla oil, by virtue of their rapid polymerizing properties, have been widely used in the manufacture of varnishes characterized by fast drying on exposure to air. Due chiefly to their different chemical nature it has not been possible to utilize many other widely available oils in producing comparable fast drying varnishes.

This invention has as an object the preparation of varnishes from oils hitherto less useful for varnish preparation. A further object is the provision of new polyhydric alcohol esters. Another object is the preparation of new and useful organic compounds. A further object is the preparation of new coating compositions. A still further object is coating compositions of accelerated drying rate. Another object is the provision of new plasticizers. Other objects will appear hereinafter.

These objects are accomplished by the following invention wherein a polyhydric alcohol ester of an unsaturated aliphatic monocarboxylic acid preferably long chain is treated with an organic compound containing a plurality of —NCX groups, X being an element of the sixth group of the Periodic System and of atomic weight less than 33.

In a preferred embodiment of the invention, a low proportion, for example from .1 to 10% by weight, of a diisocyanate or diisothiocyanate modifier is added to a varnish, paint or enamel based on a drying oil composition. A film from this mixture is found to be characterized by a more rapid rate of set-up than unmodified films and the products can be used, with proper adjustment of driers, either as air-drying or baking finishes. In certain cases, it is advisable to add the modifier at some intermediate stage in the formulation of the composition accompanied by a preheating treatment if desired. For example, in preparing a linseed oil varnish, especially attractive products are obtained by preheating a heat-bodied oil with a low proportion of modifier followed by cooking in the presence of a gum such as ester gum.

To avoid decomposition of the diisocyanate and diisothiocyanate by water, no appreciable amount of water should be present in the oil composition. It has been found however that the commercially available oils and compositions in the form of paints, enamels and varnishes may be employed without any dehydrating treatment.

The more detailed practice of the invention is illustrated by the following examples, wherein parts given are by weight and bodies and viscosities are on the Gardner-Holdt scale. There are of course many forms of the invention other than these specific embodiments.

Example I

This example illustrates the modification of a 25 gallon linseed oil varnish with a diisothiocyanate.

A mixture of 150 parts of alkali refined linseed oil and 75 parts of a 20% phenolic resin modified ester gum is heated in a varnish kettle with stirring during thirty minutes to 280° C. and is held at 280–295° C. with stirring for six hours. At this point a 50% solution of the varnish in an aliphatic hydrocarbon solvent boiling at 150–215° C. (hereinafter referred to as mineral spirits) is found to have a viscosity of G. The varnish is then pulled and when the melt has cooled to about 150° C., it is thinned with 100 parts of mineral spirits and allowed to cool with stirring to room temperature. To this varnish is then added 5% decamethylene diisothiocyanate and 0.3% cobalt drier (added as a solution of cobalt naphthenate in mineral spirits), both based on the solids content of the varnish. The varnish is now ready for use as a coating composition. Films from this product are found to harden, either on baking or air drying much more rapidly than those of a control varnish prepared similarly except that the diisothiocyanate treatment is omitted. In fact the treated varnish has such fast drying properties that it must be used shortly after preparation due to its tendency toward rapid gelation. The modified films, moreover, when fully hardened are light colored, mar resistant and comparable in durability to those obtained from standard 25 gallon wood oil varnishes.

Part of the linseed oil in the above varnish may be substituted by China-wood oil or perilla oil with a corresponding reduction both in the time required to reach the desired viscosity and also in the amount of decamethylene diisothiocyanate required to produce rapid drying films. If desired, a 100% phenolic gum such as the condensation product of p-phenyl-phenol and formaldehyde may be used instead of the 20% phenolic modified ester gum described.

By using a kettle-bodied linseed oil in the above process, the time required to cook the varnish to the desired viscosity is materially reduced. Better stability, particularly in the longer oil length varnishes, is secured by cooking bodied oils with gums to a low viscosity such as A–C (50% solution in mineral spirits) then thinning with a solution of the modifier in mineral spirits while the varnish is cooling. In carrying out the modification in this way, it is possible to cook in the driers or to add them in a soluble form after the varnish has cooled to room temperature. The resulting varnishes are found to have a higher body, i. e., D–P (50% solution in mineral spirits) depending on the amount and nature of modifier used and are faster drying than similarly formulated varnishes containing no modifier.

*Example II*

This example illustrates the modification of a vacuum bodied linseed oil with a diisocyanate (Part A) and also the use of the resulting oil in manufacturing a 45 gallon varnish (Part B).

Part A.—To 500 parts of vacuum-bodied linseed oil (prepared by heating raw oil to 275–300° C. under vacuum) of viscosity Y is added 15 parts of ethylene diisocyanate. The mixture is stirred thoroughly and then heated at 75° C. for seventeen hours after which the viscosity of the oil is found to be raised to Z–1. The rapid drying properties of this oil is shown by an experiment in which 50 parts of the treated oil is thinned with 30 parts of mineral spirits, 1.0% lead and 0.1% cobalt drier added (both based on the oil content), and the product brushed out for air drying tests. After three days it is found that the film is smooth, glossy, and practically tack-free whereas a control film prepared similarly except that the diisocyanate treatment is omitted is found to be badly wrinkled and very tacky.

Part B.—A mixture of 338 parts of the treated oil described in Part A and 112 parts of ester gum is heated in a varnish kettle with stirring to 200° C. and held at 200° C. for one hour with stirring. The melt is then allowed to cool to 150° C. and thinned with 500 parts of mineral spirits. After cooling the solution to room temperature, 0.05% cobalt drier and 1.3% lead drier (both based on oil content) are added. The varnish is now ready for use as a coating composition. It is found that films become tack-free more rapidly and exhibit much superior through-hardness than a control film prepared similarly from untreated vacuum-bodied linseed oil. Fully hardened films are found moreover to exhibit water resistance and flexibility comparable to standard 45 gallon wood oil varnishes. Varnishes prepared in this way are found to have excellent can stability even on prolonged storage.

If desired, limed rosin instead of ester gum can be used in the manufacture of the above varnish.

*Example III*

This example illustrates the modification with a diisocyanate of an enamel based on a blown linseed oil-gum blend.

To a solution prepared by stirring at room temperature 100 parts of a 20% phenolic modified ester gum in 200 parts of an aromatic hydrocarbon solvent boiling at 145–210° C. (hereinafter referred to as Hi-flash naphtha) is added 200 parts of a heavy blown linseed oil of viscosity Z–3. After stirring at room temperature about one hour until the ingredients are thoroughly mixed, this varnish, containing an oil to gum ratio corresponding to 25 gallons oil length, is ground for five days in a ball mill with 150 grams of titanium dioxide pigment and 150 grams of antimony oxide pigment. The resulting white enamel is then mixed at room temperature with 9 parts of decamethylene diisocyanate (3% based on the organic solids content of the enamel) and sufficient drier solution to give 1.0% lead and 0.1% cobalt, both based on the oil content of the enamel, and finally with sufficient mineral spirits to give a viscosity of 18–20 seconds in a #10 cup. The resulting product has a satisfactory body for spraying and is now ready for use as a coating composition. The gelation rate of the enamel has been so greatly increased that it must be used soon after preparation. To test the enamel, it is sprayed on steel panels and allowed to air-dry. It is found that the finish becomes tack-free much more rapidly and exhibits much superior through-hardness and freedom from after-tack than a control finish from an enamel prepared exactly the same except the diisocyanate treatment is omitted.

*Example IV*

This example illustrates the modification of a blown soya oil with an aromatic diisothiocyanate and the use of the product in manufacturing a 10 gallon varnish.

To 500 parts of a heavy blown soya oil of viscosity Z contained in a kettle carrying a cover fitted with a reflux condenser and heated at 100° C. are added 500 parts of Hi-flash naphtha and 10 parts of m-phenylene diisothiocyanate. The mixture is stirred at 100° C. for five hours, then 663 parts of ester gum and 277 parts of mineral spirits are added and the stirring and heating continued for an additional two hours to effect thorough blending of the gum. After cooling to room temperature, sufficient driers are added to yield 1.0% lead and 0.05% cobalt (based on oil) and the varnish is now ready for use as a coating composition. The rapid drying properties of this varnish are shown by brushing out films on filled and stained mahogany test panels. After overnight drying the finish is found to have hardened to a greater extent than a control finish from a varnish prepared similarly except the diisothiocyanate treatment is omitted. The treated varnish has excellent stability and may be stored for long periods of time without change.

*Example V*

This example illustrates the effect of a diisocyanate on a 25 gallon coconut oil-castor oil varnish.

A varnish kettle is charged with 256 parts of coconut oil, 190 parts of castor oil, and 0.3 parts of litharge (ground in 2 parts of castor oil) and the mixture heated at 200° C. for two hours. Then 223 parts of a 20% phenolic modified ester gum is added and the heating continued at 280–290° C. for one-half hour. The melt is allowed to cool to 150° C. when 336 parts of mineral spirit is added and stirring is continued to effect solution. To the resulting varnish are added 5% hexamethylene diisocyanate and 0.05% cobalt drier, both based on organic solids content. After thorough mixing, the product is now ready for use as a coating composition. To test the varnish, a film is brushed on a steel panel and allowed to air-dry for one day, after which it is found to be practically tack-free. A control film prepared similarly except the diisocyanate treatment is omitted is found to be very sticky after one day's air drying. Varnishes prepared in this way have excellent can stability.

Example VI

This example illustrates the modification of castor oil with a diisocyanate (Part A) and also the use of the product as a softener for pyroxylin (Part B).

*Part A.*—In a varnish kettle having a cover fitted with a reflux condenser are placed 500 parts of castor oil, 140 parts of hexamethylene diisocyanate, and 560 parts of freshly distilled anhydrous xylene and the stirred solution heated at 100° C. for one-half hour. On cooling to room temperature it is noted that the solution is considerably more viscous than before heating. A film flowed on glass and baked one hour at 100° C. is found to be light colored, glossy, and completely free from tack while a film of unmodified castor oil is found to be completely liquid after a similar treatment.

*Part B.*—Although the above treated castor oil can be used as a softener for pyroxylin, it is preferable to use a lower proportion of diisocyanate to secure the best results. Thus a mixture of 400 parts of castor oil, 40 parts of hexamethylene diisocyanate and 100 parts of dry xylene is heated at 100° C. for one hour. The resulting viscous solution is then blended at room temperature with a solution containing 600 parts of low viscosity lacquer grade pyroxylin dissolved in 1800 parts of butyl acetate. A film of this lacquer on force-drying one-half hour at 80° C. is found to be light colored, glossy and much harder than a control film prepared similarly except the diisocyanate treatment is omitted. By employing a higher viscosity pyroxylin of the type used to coat fabrics, it is possible to secure fabric coatings much improved with respect to exudation at elevated temperatures, a defect commonly associated with coatings prepared from unmodified castor oil. If desired blown castor oil may be used in these products instead of raw castor oil.

Example VII

This example illustrates the use of a diisocyanate modified blown castor oil in a furniture lacquer.

A stirred mixture of 1000 parts of heavy blown castor oil of viscosity Z-6, 1000 parts of freshly distilled anhydrous xylene, and 40 parts of hexamethylene diisocyanate is heated at 80° C. for two hours. After cooling to room temperature, 972 parts of the resulting solution is mixed at room temperature with 1720 parts of a 55% solution of a condensation product of one mole urea, two and one-half moles formaldehyde, and one mole isobutanol in a mixed 2:1 isobutanol-xylene solvent, 956 parts of a 50% solution of a maleic anhydride-rosin condensation product ("Teglac") in toluene, 432 parts of isobutanol and 268 parts of Hi-flash naphtha. The lacquer has a satisfactory body for spraying and is ready for use as a coating composition. The fast baking properties of the product are shown by spraying on a filled and sealed mahogany panel followed by baking at 60° C. for one and one-half hours. At the same time a control finish from a lacquer formulated similarly from untreated blown castor oil instead of the treated oil is baked at 60° C. for three hours. Immediately after baking, the two panels are tested for print resistance by placing canvas over them and over the canvas weights to the extent of 4 lbs. per square inch for two days. The modified finish shows less printing than the control showing that the diisocyanate treatment has accelerated the heat-hardening of this type of finish.

Example VIII

This example illustrates the use of a diisocyanate as an accelerator in the manufacture of linoxyn.

A reactor fitted with a stirrer and a gas inlet tube is charged with 3000 parts of varnish grade linseed oil, 750 parts of rosin, and 30 parts of litharge (ground in 60 parts of linseed oil), and the mixture heated at 100–105° C. with stirring for twenty-four hours with a vigorous stream of air bubbling into the melt. Then the air is cut off and 60 parts of hexamethylene diisocyanate is added with rapid stirring and after five minutes the mass starts to become more viscous. After ten minutes gelation has occurred yielding a rubbery product similar to unmodified linoxyn prepared by heating the above ingredients in the absence of modifier for forty-one hours. The modified linoxyn can be used in any of the applications for unmodified material such as floor coverings, wall coverings and the like. If desired, linoxyn can also be prepared by heating a mixture of 500 parts of varnish grade linseed oil and 38 parts of hexamethylene diisocyanate at 250° C., with no air blowing in, for two hours.

Example IX

This example illustrates the use of a diisocyanate in accelerating the cure of linoxyn.

A strip of linoxyn such as used in floor covering industry is immersed in a 50% solution of hexamethylene diisocyanate in dry xylene at room temperature for one minute, then is placed in an oven at 60° C. for twenty hours. It is found that the resulting strip is much harder and slightly tougher than a control strip similarly baked but not subjected to the diisocyanate treatment.

Example X

This example illustrates the effect of a diisocyanate on improving the rate of drying of a house paint.

The paint used in this test has a pigment/vehicle ratio of 63/37, the pigment being composed of 32% titanium magnesium pigment, 33% white lead, 30% zinc oxide, and 5% titanium oxide, and the vehicle being composed of 89% linseed oil, 5% drier, and 6% mineral spirits. To 2000 parts of this paint thinned with 500 parts of turpentine is added 10 parts of hexamethylene diisocyanate. After stirring for several minutes to effect thorough mixing the product is ready for use as a coating composition. The treated paint is brushed on new yellow pine and allowed to dry for three days. At this point it is noted that the finish has hardened to a much greater extent than a control finish similarly formulated except the diisocyanate treatment is omitted. The treated paint film is similar to the control with respect to color, gloss, and hiding power.

Example XI

A solution containing 5.9 parts (0.03 mol) of glyceryl dicrotonate and 2.5 parts (0.015 mol) of hexamethylene diisocyanate in 10 parts of dry dioxane is heated for 2 hours at 75° C. The somewhat dark reaction product is tested in the following manner as a cellulose nitrate plasticizer.

A film is cast on a glass plate from a solution containing 15 parts of a 21% solution of cellulose nitrate in toluene, amyl acetate, ethyl acetate, and alcohol and 2 parts of the above reaction product of hexamethylene diisocyanate and glyceryl dicrotonate, thinned to appropriate viscosity with a 1:1 mixture of dioxane and butyl acetate. The color of the film after evaporation is good and it is flexible.

The above examples have illustrated the invention with certain fatty oils. The invention is, however, generally applicable to polyhydric alcohol esters of unsaturated aliphatic monocarboxylic acids. The invention attains most favorable results in the case of the esters of long chain unsaturated acids, i. e., those of at least twelve carbon atoms and especially those having a plurality of foci of unsaturation, i. e., double bonds. The next preferred class is that of esters of long chain unsaturated acids which esters also contain a free hydroxyl group as in mono- and diglycerides or in castor oil. The invention is thus applicable to the polyhydric alcohol esters of oleic, ricinoleic, linolenic, linoleic, eleostearic, sorbic, including linseed, China-wood, soya, sunflower, perilla, oiticica, cashew nut, olive and other at least partially unsaturated natural oils.

Polyhydric alcohol esters of unsaturated aliphatic monocarboxylic acids of particular utility in the process of this invention may be prepared prior to or concurrently with modification, e. g., as follows: a neutral polyhydric alcohol ester of an unsaturated aliphatic monocarboxylic acid can be heated with a low proportion (1–25%) of a polyhydric alcohol such as glycerol to 150–225° C. for a short time, if desired in the presence of a catalyst such as litharge, or it can be heated to 150–225° C. with a polyhydric alcohol containing reactive group such as castor oil, if desired in the presence of a catalyst such as litharge. Drying oils can be heat-bodied at 250–300° C. either at atmospheric or subatmospheric pressure or heated at 100–150° C. in a current of air. Often, combinations of the above process can be used to advantage, for example, an oil can be first heat-bodied and then blown with air.

The polyhydric alcohol ester may be of any monomeric polyhydric alcohol including glycerol, ethylene glycol, diethylene glycol, triethylene glycol, erythritol, pentaerythritol, sorbitol, mannitol, as well as thio alcohols, e. g., ethan-1,2-thiol, propan-1,2,3-trithiol, butan-1,2-diol-3,4-dithiol, etc.

The preferred polyhydric alcohol esters are the glycerol esters of unsaturated fatty acids, i. e., those of unsaturated fats and oils, particularly those of at least semi-drying oils.

The invention includes not only the above esters and particularly oils, treated or untreated, but also compositions thereof with pigments, cellulose derivatives, synthetic resins, natural resins, plasticizers, driers, fillers, waxes, inhibitors, catalysts, solvents and the like. While any pigments are useful in these compositions, it is found desirable, in the case of the group of basic pigments such as zinc oxide, to treat the oil or oil composition with the modifier first, preferably at elevated temperatures, prior to the introduction of the pigment. Synthetic resins usually employed in varnishes may be added, particularly after the isocyanate modifier has reacted with the polyhydric alcohol ester. These synthetic resins include polyacrylates and polymethacrylates, polystyrene, polyvinyl esters such as polyvinyl acetate, polyvinyl chloride, polyvinyl alcohol, polyvinyl acetals, and ketals, urea-formaldehyde resins, amide-formaldehyde resins, phenol-formaldehyde resins, ester gum, hydrogenated phenol-formaldehyde resins, hydrogenated rosin, limed rosin or leaded rosin, and phenolic resin modified rosin or ester gum. Examples of suitable natural resins include rosin, copal, kauri, congo, manilla, damar and shellac. Cellulose derivatives which may be employed include pyroxylin, organic cellulose esters such as cellulose acetate, cellulose ethers such as ethyl cellulose, etc. While most of the esters, e. g., those in the form of oils do not require plasticization, certain higher melting ones may be benefited for certain applications by the use of plasticizers such as lower melting triglyceride oils, phthalate esters such as dibutyl phthalate, phenol, mineral oils, and polyhydric alcohols. The best driers for use in these compositions are those of known siccative power such as cobalt, manganese, lead, and iron naphthenates. Examples of fillers include wood flour, ground cork and mineral fillers such as mica, whiting and aluminum powders. In certain compositions it is found an advantage to incorporate waxes such as carnauba wax, beeswax, paraffin wax, hydroxystearin, spermaceti wax, and montan wax. When the oil composition is a varnish or enamel, it is sometimes advisable to add anti-skinning, anti-settling, or anti-gelling agents. Such inhibitors include creosol, pine oil, hydroquinone, guiacol, cresol and soya lecithin. In order to avoid the possibility of the diisocyanate or diisothiocyanate reacting with solvent, it is advisable to use non-reactive solvents in these compositions such as aliphatic or aromatic hydrocarbons, esters, ketones, ethers, chlorinated hydrocarbons and nitroparaffins. In compositions where the modifier has been pre-reacted by warming with the oil, it is possible to employ any suitable solvent whether reactive or non-reactive.

In addition to the compositions described above, interpolymers comprising a drying oil and a vinyl compound may be modified with a diisocyanate or diisothiocyanate. These interpolymers are prepared by heating a varnish from oils such as linseed oil, perilla oil, or wood oil with a polymerizable monomeric vinyl compound such as vinyl acetate, methyl methacrylate, or styrene either alone or in the presence of a hydrocarbon solvent.

The invention includes within its scope compositions containing several different types of ester, preferably oil, compositions. For example, enamels are frequently made by grinding a pigment in a 45–50 gallon varnish and then letting down the mill base with a 10–35 gallon varnish. In products of this type, either one or both compositions may be modified with a polyisocyanate or a polyisothiocyanate.

This invention is generic to the use of polyisocyanates and polyisothiocyanates for the modification of polyhydric alcohol including polythiol esters of aliphatic unsaturated monocarboxylic acids. Diisocyanates and diisothiocyanates, because of their greater availability, are preferred. For a similar reason hydrocarbon diisocyanate and diisothiocyanates are preferred and of these the polymethylene compounds are the most important. Illustrative polyisocyanates and polyisothiocyanates in addition to those in the above examples are tetramethylene diisocyanate, propylene-1,2-diisocyanate, butylene-1,3-diisocyanate, ethylidene diisocyanate, cyclopentylene-1,3-diisocyanate, cyclohexylene-1,4-diisocyanate, 1-methylphenylene-2,4-diisocyanate, diphenyl-4,4'-diisocyanate, p-isocyanatobenzyl isocyanate

1,2,4-benzene triisocyanate, butane-1,2,2-triisocyanate, and the corresponding isothiocyanates.

The conditions for treating these esters compositions with modifier vary widely depending on the types of oil involved and the effect desired. Most oils or oil compositions can be treated at room temperature to secure the desired effect. In many cases, however, heating at 50–300° C. causes the reaction to take place much more rapidly. This is particularly true in the manufacture of diisocyanate or diisothiocyanate modified linoxyn where a temperature of 100–300° C. is necessary as illustrated in the examples.

The proportion of modifier also depends on the ester composition being treated and on the effects desired and should be determined for each composition. It can be said, however, that esters such as bodied or blown oils, drying oil varnishes and oils modified with a low proportion of glycerol or castor oil, require low proportions of modifier in the order of 0.1–10%. On the other hand, oils containing a higher proportion of reactive positions such as castor oil often require 10–20% modifier to secure the desired results. The invention is, however, not limited to these proportions since it is found that in some special cases, lower than 0.1% or higher than 20% of the modifier yields the best results. Since the optimum proportion is easily determined by experiment, it is best to establish it for every new ester or oil composition.

When the oil composition is to be used as a film-forming material, it is possible to prepare unmodified films and to treat them, after a brief hardening with polyisocyanate or polyisothiocyanate. In carrying out the modification of films in this way, a clear varnish or an enamel is brushed or sprayed on the substrata, and partially hardened by a brief air-drying or baking. The modifier is then brushed or sprayed on the surface of the film which is then air-dried or baked to the desired state of hardness. Films treated in this way are characterized by having improved surface hardness, resistance to water and durability on outdoor exposure.

The products of this invention comprising a drying oil are useful as vehicles for improved air-drying or baking coating compositions and can be used to coat metal or wood directly or over a suitable base coat and can also be used over glass, leather, regenerated cellulose film, stone, cloth paper, rubber or cellulose. Certain ones of them are also useful as impregnating or adhesive compositions, binders for floor or wall coverings, plasticizers, and ingredients for moldings.

The invention is useful, moreover, in accelerating the polymerization rate of drying oils. For best effects, it is desirable to carry out the heat-bodying of the oil alone, either at atmospheric or subatmospheric pressure, to an intermediate state then to add a low proportion, e. g., .1 to 10% by weight of the modifier while the oil is cooling or after the oil has been thinned with mineral spirits. By this process, a considerable saving in time required to reach a high viscosity is effected and also the products are characterized by improved drying properties.

A preferred embodiment of the present invention is the treatment at 20–250° C. of drying oil compositions with 0.1–5% of an aliphatic diisocyanate. Films from these products can be hardened, by air-drying or baking, more rapidly than the unmodified films. A more preferred embodiment is the treatment at 80–150° C. of a 25–50 gallon linseed oil varnish cooked to a low degree of condensation, with 1–3% of hexamethylene diisocyanate. Films from these compositions either clear or pigmented are characterized by fast drying in the presence of air combined with good stability, color, gloss, adhesion and durability.

The above description and examples are intended to be illustrative only. Any modification of or variation therefrom which conforms to the spirit of the invention is intended to be included within the scope of the claims.

What is claimed is:

1. Process of preparing materials of improved drying properties which comprises reacting, by bringing in contact, at a temperature in the range from room temperature to about 300° C. an organic compound having a plurality of —N=C=X groups, wherein X is a member of the class consisting of oxygen and sulfur with a polyhydric alcohol ester of an aliphatic unsaturated monobasic monocarboxylic acid.

2. Process of preparing materials of improved drying properties which comprises reacting, by bringing in contact, at a temperature in the range from room temperature to about 300° C. an organic compound having a plurality of —N=C=X groups, wherein X is a member of the class consisting of oxygen and sulfur with a polyhydric alcohol ester of an aliphatic unsaturated monobasic monocarboxylic acid of at least twelve carbon toms.

3. Process of preparing materials of improved drying properties which comprises reacting, by bringing in contact, at a temperature in the range from room temperature to about 300° C. an organic compound having two —N=C=X groups, wherein X is a member of the class consisting of oxygen and sulfur with a polyhydric alcohol ester of an aliphatic unsaturated monobasic monocarboxylic acid.

4. Process of preparing materials of improved drying properties which comprises reacting, by bringing in contact, at a temperature in the range from room temperature to about 300° C. an organic diisocyanate with a polyhydric alcohol ester of an aliphatic unsaturated monobasic monocarboxylic acid of at least twelve carbon atoms.

5. Process of preparing materials of improved drying properties which comprises reacting, by bringing in contact, at a temperature in the range from room temperature to about 300° C. an organic diisocyanate with a polyhydric alcohol ester of an aliphatic polyunsaturated monobasic monocarboxylic acid of at least twelve carbon atoms.

6. Process of preparing materials of improved drying properties which comprises reacting, by bringing in contact, at a temperature in the range from room temperature to about 300° C. an organic compound having a plurality of —N=C=X groups, wherein X is a member of the class consisting of oxygen and sulfur with a polyhydric alcohol ester of drying oil acids.

7. Process of preparing materials of improved drying properties which comprises reacting, by bringing in contact, at a temperature in the range from room temperature to about 300° C.

an organic diisocyanate with a polyhydric alcohol ester of drying oil acids.

8. Process of preparing materials of improved drying properties which comprises reacting, by bringing in contact, at a temperature in the range from room temperature to about 300° C. an organic diisocyanate with a glycerol ester of drying oil acids.

9. Process of preparing materials of improved drying properties which comprises reacting, by bringing in contact, at a temperature in the range from room temperature to about 300° C. a drying oil with an organic diisocyanate.

10. Process of preparing materials of improved drying properties which comprises reacting, by bringing in contact, at a temperature in the range from room temperature to about 300° C. a bodied drying oil with an organic diisocyanate.

11. The reaction product of an organic compound containing a plurality of —N=C=X groups, wherein X is a member of the class consisting of oxygen and sulfur, and of a polyhydric alcohol ester of an aliphatic unsaturated monobasic monocarboxylic acid.

12. The reaction product of an organic compound containing a plurality of —N=C=X groups, wherein X is a member of the class consisting of oxygen and sulfur, and of a polyhydric alcohol ester of an aliphatic polyunsaturated monobasic monocarboxylic acid.

13. The reaction product of an organic compound containing two —N=C=X groups, wherein X is a member of the class consisting of oxygen and sulfur, and of a polyhydric alcohol ester of an aliphatic polyunsaturated monobasic monocarboxylic acid.

14. The reaction product of an organic diisocyanate and of a polyhydric alcohol ester of an aliphatic unsaturated monobasic monocarboxylic acid.

15. The reaction product of an organic diisocyanate and of a polyhydric alcohol ester of the acids of a heat treated drying oil.

16. The reaction product of an organic diisocyanate and of a heat treated drying oil.

17. A coating composition comprising an organic compound containing a plurality of —N=C=X groups, wherein X is a member of the class consisting of oxygen and sulfur, and a drying oil.

18. A coating composition comprising an organic diisocyanate and a drying oil.

19. Process for preparing materials of improved drying properties which comprises heating a drying oil composition at 20°–250° C. with 0.1–5% based on the drying oil of an aliphatic diisocyanate.

20. Process for preparing an improved varnish which comprises heating at 80°–150° C. 25–50 gallon linseed oil varnish cooked to a low degree of condensation, with 1–3%, based on the linseed oil, hexamethylene diisocyanate.

21. The reaction product of hexamethylene diisocyanate and heat treated linseed oil.

22. The reaction product of hexamethylene diisocyanate and heat treated castor oil.

23. The reaction product of hexamethylene diisocyanate and heat treated soya bean oil.

BURT CARLTON PRATT.
HENRY SHIRLEY ROTHROCK.